United States Patent [19]

Caprarese et al.

[11] Patent Number: 4,908,860
[45] Date of Patent: Mar. 13, 1990

[54] SYSTEM FOR THE SECRET TRANSMISSION OF AUDIO SIGNALS AND TELEVISION RECEIVER FOR RECEIVING SUCH SIGNALS

[75] Inventors: Vincent Caprarese; Thierry Chretien, both of Suresnes; Richard Dauvillier, Nanterre, all of France

[73] Assignee: U.S. Philips Corporation, New York, N.Y.

[21] Appl. No.: 853,296

[22] Filed: Apr. 17, 1986

[30] Foreign Application Priority Data

Apr. 19, 1985 [FR] France ................... 85 05951

[51] Int. Cl.$^4$ .......................................... H04N 7/167
[52] U.S. Cl. ........................... 380/19; 380/13; 380/31; 380/38
[58] Field of Search ............ 375/2.1; 455/27, 28; 179/1.5 FS; 358/121; 380/19, 13, 31, 38

[56] References Cited

U.S. PATENT DOCUMENTS

| | | | |
|---|---|---|---|
| 3,054,857 | 9/1962 | Weiss ................................. | 358/121 |
| 4,148,063 | 4/1979 | Chomet ............................. | 358/121 |
| 4,389,671 | 6/1983 | Posner et al. ................... | 179/1.5 FS |
| 4,398,216 | 8/1983 | Field et al. ...................... | 358/121 |
| 4,410,911 | 10/1983 | Field et al. ....................... | 455/28 |

FOREIGN PATENT DOCUMENTS 0085453 8/1983 European Pat. Off. ............ 358/121

*Primary Examiner*—Stephen C. Buczinski
*Attorney, Agent, or Firm*—Gregory P. Gadson

[57] ABSTRACT

Encoding is realized by means of a first low-pass input filter (21), a first modulator (20), a second low-pass filter (19), a second modulator (18) whose modulating signal has a frequency which is pseudo-random modified in the course of time, which signal is pseudo-random chosen between two signals of different frequencies (45, 46) and an output filter (17). According to the invention a first generator providing two signals is constituted by two phase-locked loop oscillators each having a frequency divider (7, 9) in the loop and both being controlled by the same reference signal generator (3, 4) while the reference signal generator itself is constituted by an oscillator of the same type (3, 4) controlled by the field synchronizing signal of the television transmitter, and this signal as well as the reference signal are applied to a first pseudo-random generator (14) for controlling the instants of change of the modulation signal. Decoding is effected similarly in the reverse order.

7 Claims, 4 Drawing Sheets

SYSTEM FOR THE SECRET TRANSMISSION OF AUDIO SIGNALS AND TELEVISION RECEIVER FOR RECEIVING SUCH SIGNALS

BACKGROUND OF THE INVENTION

The invention relates to a novel system for the secret transmission of audio signals, and particularly audio signals associated with television pictures.

The system uses an encoding arrangement, at least one transmission channel and a decoding arrangement. The encoding arrangement comprise in a cascade arrangement coupled to an input terminal:
a first filter,
a first modulator connected to a first fixed-frequency modulation signal generator,
a second filter,
a second modulator connected via a first change-over switch to two outputs of a first generator supplying at these two outputs two modulation signals having two different frequencies, said change-over switch being controlled by a first pseudo-random generator for selecting one or the other of these two modulation signals, and
a third filter.

The decoding arrangement comprises a field sync pulse generator, a separator for separating a reference signals received simultaneously with the encoded audio signals, and, in a cascade arrangement coupled to an input terminal:
a fourth filter,
a third modulator connected via a second change-over switch to two outputs of a second generator supplying at these two outputs two modulation signals having two different frequencies, said change-over switch being controlled by a second pseudo-random generator for selecting one or the other of these two modulation signals,
a fifth filter,
a fourth modulator connected to a second fixed frequency modulation signal generator,
a sixth filter.

SUMMARY OF THE INVENTION

A system of this type is known from JP-A No. 58 124 343. It is an object of the invention to simplify the construction of the encoding and decoding arrangements, and to provide an economical solution to the problem posed by the occurrence of switching noise when one modulation signal is passed on to the other without any particular precautions.

The invention provides an encoding arrangement whose cryptic sound is substantially inviolable, which does not produce any switching noise, which does not require any pre-emphasis and which employs signals in the common transmitter baseband for obtaining a direct compatibility.

The encoding circuit according to the invention is characterized in that the first generator supplying two signals is constituted by two phase-locked loop oscillators each comprising a frequency divider in the loop and being controlled by their own reference signal generator, in that the reference signal generator itself comprises an oscillator of the same type controlled by the field synchronizing signal of the television transmitter and in that this signal as well as the reference signal are applied to a synchronizing circuit of the first pseudo-random generator for controlling the instants of change of the modulation signal. Thus, the arrangement only comprises dividers whose division ratio is low and ensures a well-controlled phase ratio between the two oscillators having proximate frequencies (for example, 14 and 15.2 kHz) to prevent the switching noise.

When the above-mentioned fixed frequency is F and the distance between F and the cut-off frequency of the input filter is $\Delta F$, the two different frequencies are advantageously equal to $F+\Delta F$ and $F+2\Delta F$, $\Delta F$ being preferably between 1 and 3 kHz. This provides the advantage that the two encoded resultant waves supplied by the second modulator can be filtered by the same filter while obtaining the best compromise between the highest possible audio passband and a sufficient distance between the two frequencies, which distance is required to render the encoded signal unintelligible. This will be described in greater detail with reference to the Figures. The system is, inter alia, directly compatible with any AM or FM transmission equipment currently used.

The reference signal generator whose frequency is lower than that of the audio signals is advantageously connected to an adder circuit for adding the reference signal to the audio signal, and a phase circuit and a filter are interposed between the reference signal generator and the adder.

The decoding arrangement according to the invention is characterized in that the second generator supplying two signals is constituted by two phase-locked loop oscillators each comprising a frequency divider in the loop and being controlled by the reference signal, and in that the second pseudo-random generator is connected to the reference signal separator and to the field sync pulse generator for controlling the instants of change of the modulation signal.

A television receiver according to the invention is characterized in that a decoding arrangement according to the invention is arranged between the sound detection circuit and the sound amplifier.

BRIEF DESCRIPTION OF THE INVENTION

The invention will now be described in greater detail by way of example with reference to the drawings.

DETAILED DESCRIPTION OF THE INVENTION

Figure 1:
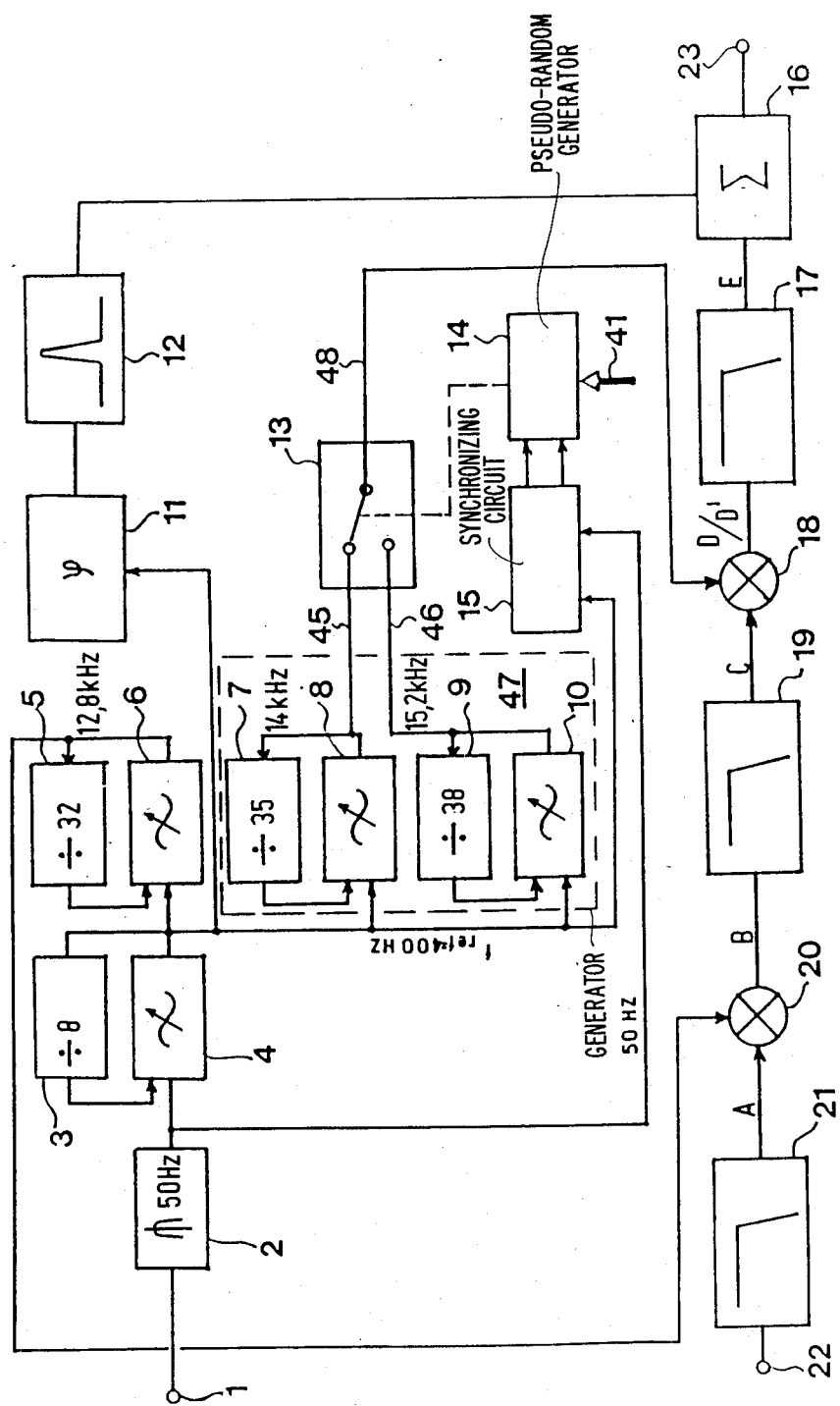
FIG. 1 is a block diagram of an encoding arrangement according to the invention.

The encoding arrangement of FIG. 1 comprises an input or first filter 21 coupled to an input terminal 22 to which the audio signal to be encoded is applied; the output of the first filter 21 is coupled to an input of a first modulator 20 the other input of which is connected to a first fixed frequency modulation signal generator 5,6.

The output of the first modulator 20 is coupled to the input of a second filter 19 whose output is coupled to an input of a second modulator 18 the other input of which is coupled via a connection 48 to the common output or "contact pin" of a first two-way change-over switch 13. The reference "contact pin" is used symbolically to make the interconnections clearly visible, but actually the first change-over switch 13 is an electronic switch formed by analog switching transistors.

One input terminal of the change-over switch 13 is connected to an output 45 of a part 7, 8 of a first generator 47 from which output 45 a modulation signal is supplied and an other input terminal pf the first change-over switch 13 is coupled to an output 46 of another part 9, 10 of this first generator 47 from which output 46 a modulation signal is supplied which has a frequency differing from that of the signal supplied by the part 7, 8.

A first pseudo-random binary sequence generator 14, which on itself does not form part of the invention, supplies in known manner from a secret key 41 a pseudorandom control signal to the first change-over switch 13 and under this control the signal at the connection 48 represents alternately the one frequency and the other frequency being supplied through the outputs 45, 46 by the first generator 47.

For transmitting the audio signals in a baseband up to, for example, 11.6 kHz the two frequencies supplied from the outputs 45, 46 are advantageously equal to 14 kHz and 15.2 kHz, respectively. The reason for this choice will be explained hereinafter.

The frequency of the signal supplied by the first fixed frequency modulation signal generator 5, 6 is 12.8 kHz. This frequency lies thus between the baseband of the audio signal and the two above-mentioned frequencies.

The generator 47 is constituted by two phase-locked loop oscillators 8, 10 and 7, 9 respectively, both connected to a reference signal generator 3, 4. This system is incorporated in a television transmitter circuit for encoding the audio signals. The composite video signal of this transmitter is applied via an input 1 to a field sync pulse extraction circuit 2 and the frequency of these field sync pulses, for example, 50 Hz in accordance with the European standards is multiplied in a multiplier 3, 4 which is coupled to an output of the circuit 2 is connected.

This multiplier 3,4 which constitutes the beforementioned reference signal generator, comprises an oscillator 4 with a phase-locked loop 3 which loop incorporates an 8-to-1 divider. The reference signal supplied by this multiplier 3, 4 thus has a frequency of 50 Hz×8=400 Hz and it is a square-wave signal with duty cycle.

The phase-locked loops 7, 9 of the oscillators 8 and 10 comprise a 35-to-1 and a 38-to-1 divider and thus supply signals at 400 Hz×35=14 000 Hz and at 400 Hz×38=15 200 Hz.

The loop 5 of the oscillator 6 comprises a 32-to-1 divider and thus supplies a signal at 400 Hz×32=12 800 Hz.

All these signals, which are controlled by the same oscillator at 400 Hz, are square-wave signals of ½ duty cycle and are periodically in phase every 2.5 msec. (corresponding to one period of the signal at 400 Hz). The same signal at 400 Hz is also applied to a synchronizing circuit 15 likewise as the field sync pulses. This circuit 15 applies clock and validation signal to the pseudo-random generator 14 from which signals the generator 14 determines the instants of change of the value of the control signal which is applied to the first change-over switch 13. Thus, this first change-over switch 13 is not activated until the instants when the two signals at 14 kHz and 15.2 kHz are in phase, that is to say, at the instant when they present together, for example, a leading edge so that any audible transition during switching is prevented.

The reference signal is applied to an adder circuit 16 for adding the reference signal to the audio signal. This signal advantageously has such an amplitude that its modulation factor in the transmitted sound signal is of the order of 10%.

A phase shifting circuit 11 and a filter 12 are arranged between the reference signal generator 3, 4 and the adder 16.

The phase shifting circuit 11 has for its object to compensate for the phase differences occurring between the video signal at the output of the transmitter from which the reference end which phase difference is due to different signal processing and which is constant and is compensated by an adjustment of the phase shifter 11. The filter 12 is a 400 Hz filter having a bell-shaped characteristic curve and intended to eliminate the harmonics in the reference signal, which harmonics might cause the risk of disturbing the audible frequency band.

Figure 2:
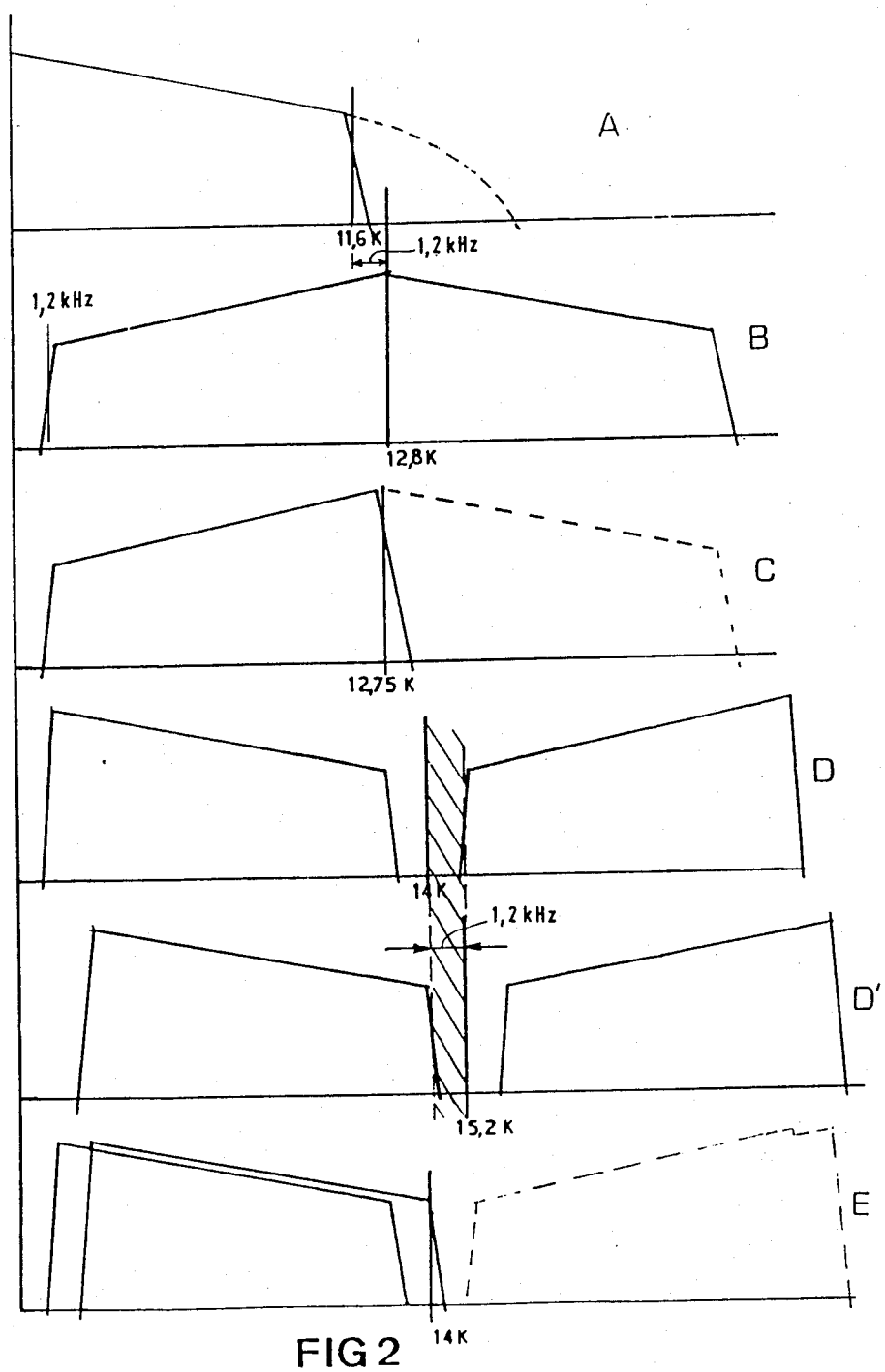
FIG. 2 illustrates the successive frequency spectra of the sound channel during encoding.

FIG. 2 illustrates the operation of the circuits of FIG. 1 and the effects produced on the frequency spectrum.

FIG. 2A shows the spectrum of the audio signal supplied through the input filter 1. A broken line represents the spectrum before filtering. The passband is limited below the modulation frequency, which is indicated by a vertical line, in order to prevent inversion of the spectrum. This frequency is chosen to be 12.8 kHz so as to ensure compatibility with the standard of channel +. It is evident that it is possible to choose a higher frequency (also as far as the two other frequencies are concerned) when a wider passband is desired and when the television transmission standard permits of transmitting this wider band. The input filter is a seventh order low-pass filter of the Cauer type, and its frequency for the 3 dB attenuation is 11.6 kHz.

The spectrum is shown with a slope to suggest that the average power content of higher sound frequency is lower than that of the lower sound or bass-frequencies and also for clearly visualizing the inversions of the spectra after modulation.

FIG. 2B shows the spectrum of the audio signal after its passage through the first modulator 20 at 12.8 kHz. Two sidebands are produced around the modulation frequency and the lower band has a spectrum which is inverted with respect to that of FIG. 2A.

FIG. 2C shows the spectrum of the audio signal after its passage in the second filter 19 succeeding the first modulator 20. The purpose of this second filter 19 is to eliminate the upper sideband (shown in broken lines) and is a fourteenth order Cauer filter constituted, for example, by two seventh order filters arranged in cascade at a frequency of 12 750 for 3 dB attenuation. This frequency at 50 Hz below the frequency of the modulator thus introduces in practice a cut-off of the low frequencies below 50 Hz.

FIGS. 2D and 2D' show the spectrum of the audio signal after its passage through the second modulator 18; FIG. 2D refers to the situation in which a frequency of 14 kHz is applied to the second modulator 19 and FIG. 2D' refers to a situation in which a frequency of 15.2 kHz is applied. As essential characteristic feature of the system appears in these Figures: because of the fact that the difference between the cut-off frequency of the first filter 21 and the frequency of the first modulator 20 is 1.2 kHz, there is an unoccupied band of 1.2 kHz in FIGS. 2B and 2C top the left of the spectrum of the audio band; this band is shown in FIGS. 2D, 2D' in the form of a track having a width of 2.4 kHz between the side bands of the signal at the output of the second modulator 18, and there is a common unoccupied frequency range between the two tracks in FIGS. 2D and 2D' indicated by a shaded vertical band. This makes it possible to eliminate the upper sideband in the two cases of the Figure (D and D') with a single filter whose cut-off frequency is in this common unoccupied frequency range.

FIG. 2E shows the spectrum of the audio signal after the third filter 17 succeeding the second modulator 18, and there is a common unoccupied frequency range between the two tracks in FIGS. 2D and 2D' indicated by a shaded vertical band. This makes it possible to eliminate the upper sideband in the two cases of the Figure (D and D') with a single filter whose cut-off frequency is in this common unoccupied frequency range.

FIG. 2E shows the spectrum of the audio signal after the third filter 17 succeeding the second modulator 18. The suppressed upper sidebands are shown in broken lines. The filter 17 is a seventh order Cauer filter having a cut-off frequency of 14 kHz at 0 dB. The spectrum obtained is similar to the initial spectrum but it has a frequency shift of 1.2 or 2.4 kHz with respect to the input spectrum. The system is thus directly compatible with all AM or FM transmission equipment currently used. Since the spectrum is shifted upwards at least over 1.2 kHz, the unoccupied position below the audio frequencies is utilized for the reference signal (at 400 Hz) without disturbing the audible signals.

The choice of the frequencies is submitted to a given humber of requirements. The distance between the frequencies is a multiple of the common reference frequency. If the difference between the two frequencies supplied to the second modulator 18 is increased with respect to each other, the distance between the cut-off frequency of the input filter 21 and that of the first modulator 20 is also to be increased so as to preserve a common unoccupied frequency range (FIGS. 2D and 2D'). For this reason the passband is limited. When on the other hand the distance between these frequencies is reduced, the effect of encoding diminishes and the more these frequencies approximate each other the more the sound becomes intelligible without decoding. The frequencies mentioned above constitute a good compromise between these contradictory requirements. They can easily be modified, as will be evident hereinafter, but when F is the fixed frequency of the first modulator and $\Delta F$ is the distance between F and the cut-off frequency of the input filter 21, it is advantageous that the two alternate frequencies are equal to $F+\Delta F$ and $F+2\Delta F$ and that $\Delta F$ is an integral multiple of the reference frequency.

Figure 3:
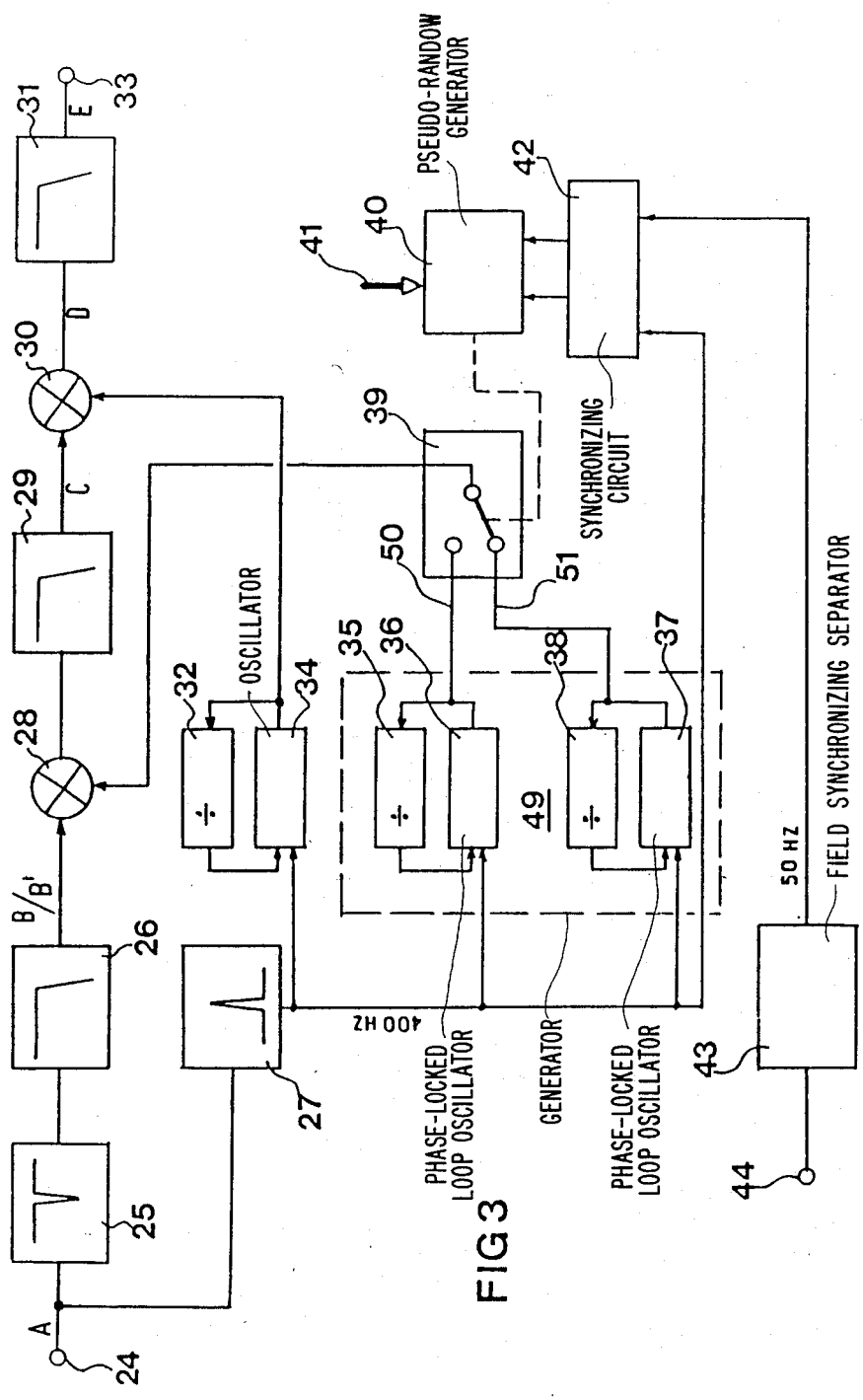
FIG. 3 is a block diagram of a decoding arrangement according to the invention.

In the decoding arrangement of FIG. 3 the sound signal detected, for example, by the circuits of a television receiver (not shown) is applied to the input 24 of the decoding arrangement. In this respect it is to be noted that it is not very important which type of modulation is used for the transmission between the transmitter and the receiver (AM, FM, in any variant) because encoding is effected after-demdoulation to baseband. The decoding arrangement performs the same operations as the coding arrangement, but in the reverse order. However, the origin of the reference signal in the encoding arrangement differs from that in the decoding arrangement.

The decoding arrangement comprises subsequent to and in a cascade arrangement from an input 24 a 400 Hz rejection circuit 25 for eliminating the reference signal, a low-pass input or fourth filter 26, a third modulator 28 succeeded by a fifth low-pass filter 29, a fourth modulator 30 succeeded by a sixth low-pass filter 31.

The decoded audio signal is available at the output of this sixth low-pass filter 31.

A second generator 49 for supplying two modulation signals at two different frequencies each from a distinct output 50, 51 is included in the decoding arrangement.

A second pseudo-random generator 40 for the control signals is coupled for control to a second two-way change-over switch 39. Each output 50, 51 of the second generator 49 is coupled to one of the input terminals of the second change-over switch 39 and the common output or "contact pin" of this second change-over switch 39 is coupled to the third modulator 28 for applying the modulation signal thereto. Here again the term "contact pin" is used symbolically, because the second change-over switch 39 is a fully electronic analog change-over switch. A second fixed frequency modulation signal generator 32, 34 is coupled to the fourth modulator 30 for applying the modulation signal thereto.

The generator 49 is constituted by two phaselocked loop oscillators 36 and 37, each loop comprising dividers 35, and 38, respectively, and being coupled to a reference generator 27.

This reference generator 27 is constituted by a separator 27 connected to the input 24 of the demodulator, which separator extracts the reference signal received simultaneously with the encoded audio signals from the input signal. This separator 27 is constituted by a bell filter with a passband of 400 Hz.

Likewise as in the transmitter, the second pseudo-random generator 40 functions in known manner by means of a secret key 41 and under the control of the clock and validation signals provided by a synchronizing circuit 42 which receives the 400 Hz reference signal supplied by the separator 27, as well as field sync pulses obtained from a field synchronizing separator 43 connected to the output 44 of the video detection circuit (not shown) of the television receiver.

Figure 4:
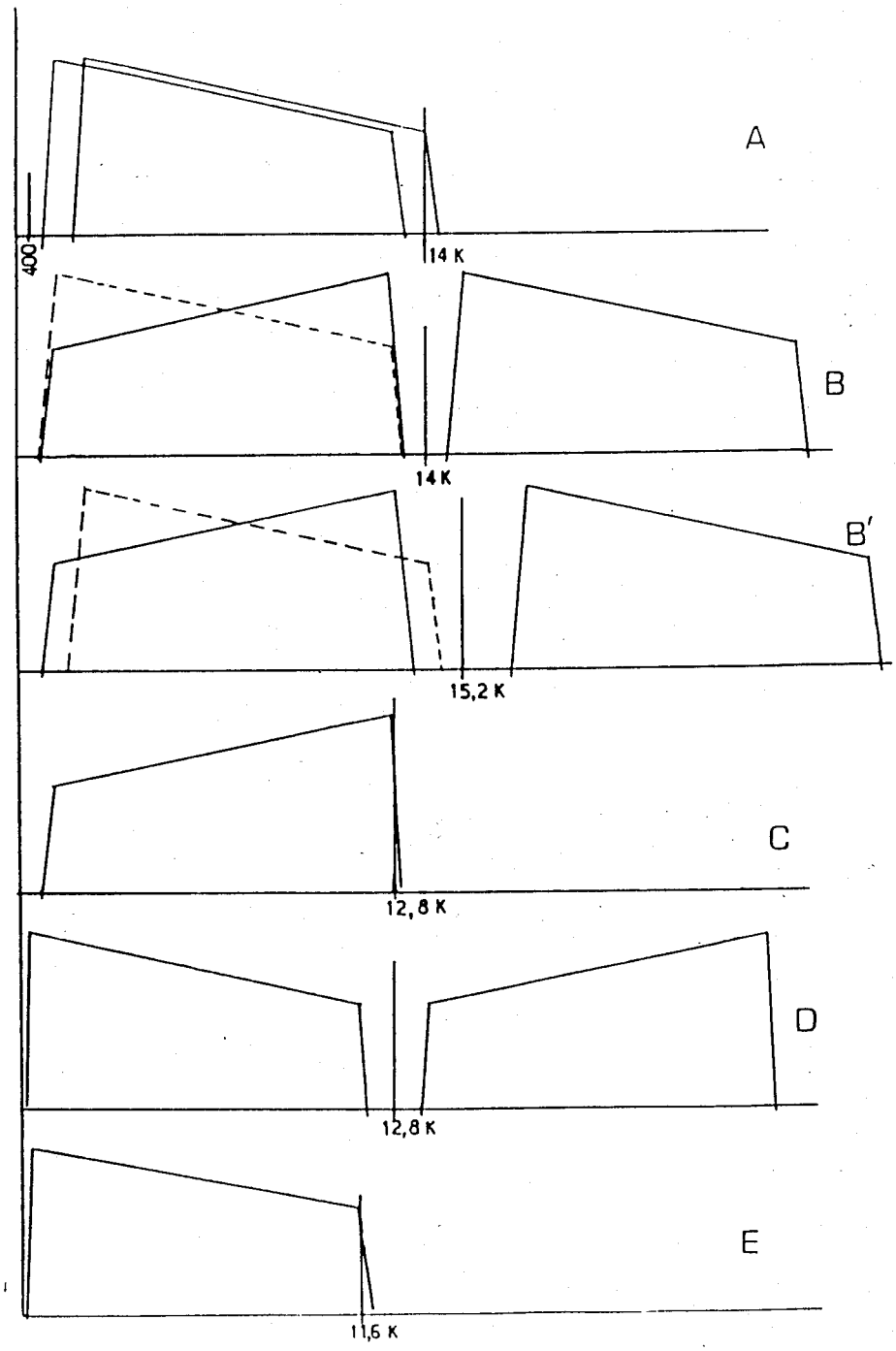
FIG. 4 shows the successive frequency spectra of the sound channel during decoding.

FIG. 4 illustrates the operation of the circuits of FIG. 3 and the effects produced on the frequency spectrum. Substantially the same diagrams as those in FIG. 2 are shown in the reverse order, however, certan filters may have different performances or tuning frequencies.

The spectrum of the input signal is shown at A and is identical to that of FIG. 2E with an additional reference frequency indicated by a line at 400 Hz. This reference frequency is first eliminated by the 400 Hz rejecion circuit 25 subsequently the signal is filtered in the seventh order Cauer type input or fourth filter 26 and adjusted to 0 dB at 14 kHz (a fifth order may suffice, the choice being dependent on the degree of the quality to be envisaged).

This filter is used for completing the elimination of the 15.2 kHz carrier as well as for eliminating the possible residues of the 15625 Hz line frequency.

The signal is subsequently modulated in the third modulator 28. FIGS. 4B and 4B' show the result obtained. The broken line indicates the spectrum of the input signal of the third modulator 28. When the correct key is supplied to the second pseudo-random generator 40, this generator selects at each instant one of the two signals at the outputs 50, 51 each providing a modulation frequency in synchronism with the encoder of the transmitter. This means that a modulation frequency of 14 kHz always corresponds to the input spectrum (in a broken line) of FIG. 4B and a modulation frequency of 15.2 kHz always corresponds to the input spectrum (in a broken line) of FIG. 4B'. The lower part of the resultant spectrum shown in FIG. 4C is thus fixed. The upper part is variable in accordance with that of the two frequencies in question. Filtering in the fifth filter 29 then eliminates these upper side bands, the filter being of the seventh order Cauer low-pass type with a cut-off frequency of 12.8 kHz at 0 dB which results in the spectrum C.

A fourth modulation at 12.8 kHz results in the spectrum D and filtering in the sixth filter 31 at the output eliminates the upper side band and the resultant carrier. The filter 31 is a seventh order Cauer low-pass filter arranged to obtain 0 dB at 11.6 kHz. Thus the spectrum E is finally obtained which is substantially identical to the spectrum A of FIG. 2 with a cut-off below 50 Hz due to the filtering at 12.75 kHz of the encoder (FIG. 2C).

In a practical realization of the circuits of FIGS. 1 and 3 the Applicant has utilized integrated modulators, for example, of the type MC1496 or TCA240, or other types. These circuits give a satisfactory rejection of the modulation frequency and the input frequency. Active filters based on operational amplifiers having a high input impedance, for example, of the type TL074 have been used as Cauer low-pass filters. The seventh order filters may all be identical in construction. Coil filters and capacitors which are commercially available with the required characteristics may also be used. It is likewise possible to use filters of the switched capacitor type in integrated circuits.

The change-over switches 13, 39 may be realized by means of integrated circuits, for example, of the type HEF4053.

The phase-locked loop oscillators may be realized by means of integrated circuits HEF4046, the frequency divider in the loop may be realized by means of integrated circuits HEF4024 and the phase shifting circuit may be realized by means of an integrated circuit HEF4538.

The rejection circuit and the separator circuit may each of easily realized by means of an operational amplifier associated with a double T filter in a feedback loop.

The pseudo-random generators and its synchronizing circuits have been realized by means of integrated circuits HEF 4035, HEF 4070, HEF 4014. The clock signal of the fixed generators is derived from the 400 Hz signal which is divided in such a manner that a clock signal of several Hz is obtained. The validation signal is derived from the field synchronising signal of 50 Hz and is divided to obtain a period of several seconds. The clock signals and validation signals may be synchronous with a signal transition at 400 Hz.

The use of all these circuits for realizing each of the functions mentioned is well known to those skilled in the art: the manual documents of these circuits state all the required indications.

In the case of the field frequency of 60 Hz as, for example, in the United States of America the frequencies used can be easily adapted. For example, a baseband signal having a frequency of 300 Hz can be used, i.e. 5 times 60 Hz, and the dividers of the oscillators 6, 8, 10 or 34, 36, 37 are then arranged to obtain division ratios providing $43 \times 300$ Hz$=12900$ Hz, $47 \times 300$ Hz$=14100$ Hz and $51 \times 300$ Hz$=15300$ Hz, respectively. The frequencies of the filters are then all increased by 100 Hz. This method may otherwise be equally used for European standards because a 300 Hz reference signal can be obtained by $6 \times 50$ Hz, however, with the inconvenience for France only that the frequency of 12900 Hz is not exactly compatible with channel +. Other combinations of frequencies are feasible provided that they have distances between them which remain of the order of 1 to 2 kHz. A reference signal of 625 Hz obtained by dividing the European line frequency by 25 or a signal of 525 Hz in the case of the United States may also be used. Similarly the orders of the filters may be increased or reduced without passing beyond the scope of the invention, resulting in the quality of the signal with respect to that obtained by the above described circuits being improved or degraded as the case may be.

We claim:

1. An encoding arrangement for the secret transmission of television audio signals comprising in a cascade arrangement from an input terminal:

a first filter, a first modulator coupled to a first fixed-frequency modulation signal generator, a second filter, a second modulator coupled via a first change-over switch to out outputs of a first dual-frequency modulation signal generator supplying at these two outputs two modulation signals having two different frequencies, said change-over switch being controlled by a first pseudo-random generator for selecting one or the other of these two modulation signals and a third filter, characterized in that the first dual frequency modulation signal generator supplying two signals comprises two phase-locked loop oscillators each comprising a frequency divider in the loop and both being controlled by the same reference signal generator, in that this reference signal generator itself comprises an oscillator controlled by the field synchronizing signal of the television transmitter, and in that this signal as well as the reference signal are applied to a synchronizing circuit of the first pseudo-random generator for controlling the instants of change of the modulation signal.

2. An arrangement as claimed in claim 1, characterized in that when the said fixed frequency is F, and the distance between F and the cut-off frequency of the first filter is $\Delta F$, said two different frequencies are equal to $F + \Delta F$ and $F + 2\Delta F$.

3. An encoding arrangement as claimed in claim 2, characterized in that $\Delta F$ is between 1 and 2 kHz.

4. An encoding arrangement as claimed in claim 1, characterized in that the reference signal generator is coupled to an adder circuit for adding the reference signal to the audio signal, the reference frequency being lower then the audio frequencies.

5. An encoding arrangement as claimed in claim 4, characterized in that a phase shifting circuit and a filter are arranged between the reference signal generator and the adder.

6. A decoding arrangement for receiving television audio signals transmitted by the arrangement as claimed in any one of claims 1 to 5, comprising a separator for separating a reference signal received simultaneously with the encoded audio signals and, arranged in cascade from an input terminal:

a fourth filter, a third modulator coupled via a second change-over switch to two outputs of a second dual-frequency modulation signal generator supplying at these two outputs two modulation signals having two different frequencies, said second change-over switch being controlled by a second pseudo-random generator for selecting one or the other of these two modulation signals, a fifth filter, a fourth modulator coupled to a second fixed-frequency modulation signal generator, and a sixth filter, characterized in that the second dual-frequency modulation signal generator supplying two signals comprises two phase-locked loop oscillators each comprising a frequency divider in the loop and being controlled by the reference signal, and in that the second pseudo-random generator is coupled to the reference signal separator and to a field sync pulse generator for controlling the instants of change of the modulation signal.

7. A television receiver, characterized in that an arrangement as claimed in claim 6 is disposed between a sound detection circuit and a sound amplifier.

* * * * *